Nov. 24, 1936.　　　　C. OPOLO　　　　2,062,012
DIVIDED AXLE WITH LEAF SPRING SUSPENSION

Original Filed April 25, 1934

Inventor
Charles Opolo.
by Hazard and Miller
Attorneys.

Patented Nov. 24, 1936

2,062,012

UNITED STATES PATENT OFFICE 2,062,012

DIVIDED AXLE WITH LEAF SPRING SUSPENSION

Charles Opolo, Culver City, Calif.

Original application April 25, 1934, Serial No. 722,268. Divided and this application June 30, 1936, Serial No. 88,154

6 Claims. (Cl. 267—19)

My invention relates to a type of axle in which either wheel mounted on the axle may move up and down relative to the frame of the vehicle without materially affecting the opposite wheel. This application is a division of my application for Flexible axle for vehicles, Ser. No. 722,268, filed April 25, 1934, matured to Patent No. 2,047,286, dated July 14, 1936.

An object and feature of my invention in this form of having two half axles pivoted together and to a member depending transversely from the vehicle frame, is in using a leaf spring both above and below the axle assembly, each of these springs being secured at its outer end by means of a swivel shackle to the axle. The center portion of the leaf spring built up of a number of leaves is adapted to bear against the central portion of the axle above and below the longitudinal pivot.

With this construction the transverse springs preferably extend above and below the axle sections and rubber pads are attached to the springs at their center portion to engage the axle during the up and down flexing of the springs and either or both axle sections.

With my type of spring mounting for the vehicle axle sections the amount of unsprung weight of a vehicle may be materially reduced, this being due to the fact that the springs have an effect of suspending the axle sections, to-wit: allowing these to respond to either bumps or depressions in the road.

My invention is illustrated in connection with the accompanying drawing, in which.

Figure 1:
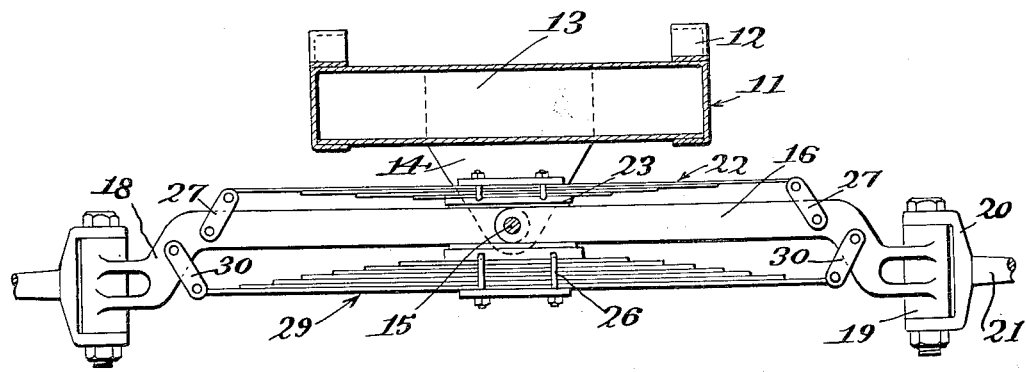
Fig. 1 is a vertical section through a part of a vehicle showing the axle sections and springs in elevation.
Figure 2:
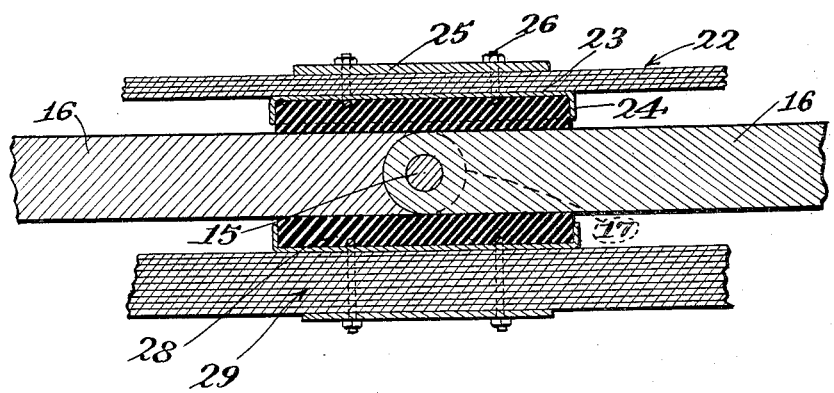
Fig. 2 is a partial enlarged view similar to Fig. 1 with the springs and axle sections shown in section.

Referring to the construction of Figs. 1 and 2, the vehicle frame 11 is illustrated as having side rails 12 and a transverse beam 13. From this beam is a pair of depending brackets 14, these being tapered, and through these brackets there extends a pivot pintle 15, this being secured in any suitable manner. Two half axles 16 are pivoted on their inner portions 17 to the pivot pin 15. Each of these is illustrated as having a drop section 18 adjacent their outer ends and a hub section 19 through which connects the yoke 20 and the swivelling axles 21, the latter carrying the vehicle wheels.

The spring mounting comprises an upper set of leaf springs 22. These have a metal plate 23 at the center portion, this having a downturned flange 24. A strap 25 is on the top of the stack of beams, the plate 23, the leaf springs and plate 25, and connected by a U-shaped clamp 26. The outer ends of the longest leaf are connected by shackles 27 to the outer portion of each axle section. A rubber pad 28 fits underneath the plate 23 being held in place by a downturned flange 24 and the axle sections on which the rubber pad bears.

The lower leaf spring assembly 29 is similar to the upper spring assembly as to the set-up and construction of the leaf springs and the use of a rubber pad. This spring assembly is connected by shackles 30 to the outer end of each axle section.

The springs are preferably initially tensioned so that they tend to arch in such a manner that the rubber pads are pressed snugly against the axle sections. Thus the weight of the vehicle tends to pivot the outer wheel ends of the axle sections upwardly. This is resisted mainly by the lower leaf spring assembly which is thus placed in a condition of tension, the pull of the shackles 30 tending to flatten this spring. When either or both wheels strike a bump in the road either one axle section 16 or both will pivot upwardly on their pivot 15 in relation to the vehicle frame. This will increase the tension or pull of the spring assembly 29, resisting its upward movement. When either one or both wheels drop into a depression in the road, the upper leaf assembly is mainly brought into action and resists the downward movement of each half axle section. Thus the two spring assemblies tend to maintain the axle sections horizontally and in alignment. The spring pads press respectively on the upper and lower surfaces of the half axle sections. With this construction, if either or both springs are made so that they may carry compressive as well as tension stresses, only one spring assembly either above or below the axle may be used and will be satisfactory.

Various changes may be made in the details of the construction without departing from the spirit or scope of the invention as defined by the appended claims.

I claim:

1. In a device as described, a vehicle frame having a transverse member, a longitudinal pivot connected thereto, a pair of axle sections pivoted on said longitudinal pivot and extending transversely of the vehicle on opposite sides thereof, a leaf spring having its outer ends connected to the outer portions of each axle section and extending transversely of the vehicle in vertical alignment with the axle sections and a pad connected to the spring and adapted to engage the axle sections adjacent their pivot during up and down movement of the axle sections.

2. In a device as claimed in claim 1, a second leaf spring having its outer ends connected to the outer portions of the axle sections and extending transversely of the vehicle in alignment with the axle sections and on opposite sides to the first spring, the second spring having a pad to engage the axle sections adjacent the pivot during up and down movement of the axle sections.

3. In a device as described, a vehicle frame having a depending central bracket, an axle having a pair of axle sections each pivoted to the bracket, a leaf spring having shackles at opposite ends connecting said ends of the spring to the outer portions of the axle sections, the said spring being disconnected from the vehicle frame.

4. In a device as claimed in claim 3, a second leaf spring connected by shackles between the outer ends of such second spring and the outer portions of the axle sections, one of the springs being above and the other below the axle sections, and a pressure means on the springs to engage the axle sections adjacent their point of pivot.

5. In a device as described, a vehicle frame having a central depending bracket, an axle having a pair of axle sections, each pivoted to the bracket, a leaf spring having shackles at opposite ends connecting said ends of the spring to the outer portions of the axle sections, a flanged plate connected to the leaf spring adjacent its center and having a rubber pad fitted therein, the pad being adapted to engage the axle sections adjacent their pivot on the up and down movement of the axle sections, said spring being disconnected from the vehicle frame.

6. In a device as claimed in claim 5, a second leaf spring connected by shackles between the outer ends of said spring and the outer portions of the axle sections, one of the springs being above and the other below the axle sections, a flanged plate connected to the second spring, a rubber pad fitted therein and positioned to engage the axle sections adjacent their pivot on the up and down movement of the axle sections, said second spring being disconnected from the vehicle frame.

CHARLES OPOLO.